US010216492B2

United States Patent
McCoy et al.

(10) Patent No.: US 10,216,492 B2
(45) Date of Patent: Feb. 26, 2019

(54) CONFIGURATION AND MANAGEMENT OF MENUS

(75) Inventors: Charles McCoy, Coronado, CA (US); Leo Mark Pedlow, Jr., Ramona, CA (US); Ling Jun Wong, Champaign, IL (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 236 days.

(21) Appl. No.: 13/474,583

(22) Filed: May 17, 2012

(65) Prior Publication Data

US 2013/0311882 A1 Nov. 21, 2013

(51) Int. Cl.
| | |
|---|---|
| G06F 8/38 | (2018.01) |
| G06F 3/0481 | (2013.01) |
| G06F 3/0482 | (2013.01) |
| G11B 20/00 | (2006.01) |
| H04N 1/00 | (2006.01) |
| H04N 5/445 | (2011.01) |

(52) U.S. Cl.
CPC .............. *G06F 8/38* (2013.01); *G06F 3/0481* (2013.01); *G06F 3/0482* (2013.01); *G11B 20/00159* (2013.01); *H04N 1/00509* (2013.01); *H04N 5/44543* (2013.01)

(58) Field of Classification Search
CPC .... G06F 9/4448; G06F 3/0481; G06F 3/0482; G06F 8/38; G11B 20/00159; H04N 1/00509; H04N 5/44543
USPC ................................. 715/703, 789, 811, 825
See application file for complete search history.

(56) References Cited

U.S. PATENT DOCUMENTS

| | | | | |
|---|---|---|---|---|
| 5,448,043 | A * | 9/1995 | Nakano et al. | 235/379 |
| 7,149,889 | B2 * | 12/2006 | Stalker et al. | 713/2 |
| 7,240,323 | B1 * | 7/2007 | Desai | G06F 8/38 |
| | | | | 707/999.101 |
| 7,797,428 | B2 | 9/2010 | Jung et al. | |
| 8,843,853 | B1 * | 9/2014 | Smoak | G06F 3/0482 |
| | | | | 715/839 |
| 2003/0151621 | A1 | 8/2003 | McEvilly et al. | |
| 2005/0160458 | A1* | 7/2005 | Baumgartner | 725/46 |

(Continued)

FOREIGN PATENT DOCUMENTS

| | | |
|---|---|---|
| CN | 101035221 A | 9/2007 |
| CN | 101222710 A | 7/2008 |

(Continued)

OTHER PUBLICATIONS

Android Developers, "Localization," no publication date available, accessed on Jul. 27, 2012 at http://developer.android.com/guide/topics/resources/localization.html, 6 pages.

*Primary Examiner* — Ajay M Bhatia
*Assistant Examiner* — Mong-Shune Chung
(74) *Attorney, Agent, or Firm* — Procopio, Cory, Hargreaves & Savitch LLP

(57) ABSTRACT

Customizing menus for a consumer electronics device, including: preparing menu definitions for the menus to be customized on the consumer electronics device; generating menu configuration information using the prepared menu definitions; and transmitting the generated menu configuration information to the consumer electronics device. Keywords include customization of menus and consumer electronics device.

30 Claims, 5 Drawing Sheets

(56) References Cited

U.S. PATENT DOCUMENTS

| | | | |
|---|---|---|---|
| 2007/0133051 A1* | 6/2007 | Hyakutake et al. | 358/1.15 |
| 2007/0211168 A1 | 9/2007 | Ko et al. | |
| 2008/0070548 A1 | 3/2008 | Cha et al. | |
| 2009/0063659 A1* | 3/2009 | Kazerouni et al. | 709/219 |
| 2009/0113346 A1* | 4/2009 | Wickramasuriya | G06F 3/0481 715/825 |
| 2009/0276808 A1 | 11/2009 | Jerding et al. | |
| 2012/0102438 A1* | 4/2012 | Robinson | G06F 3/011 715/863 |
| 2013/0208303 A1* | 8/2013 | Uchida | G06F 3/0482 358/1.15 |
| 2013/0246095 A1* | 9/2013 | Mailhot | 705/3 |

FOREIGN PATENT DOCUMENTS

| | | |
|---|---|---|
| CN | 101699396 A | 4/2010 |
| CN | 102223441 A | 10/2011 |
| WO | WO 0196994 A2 * | 12/2001 |

* cited by examiner

CONFIGURATION AND MANAGEMENT OF MENUS

BACKGROUND

Field of the Invention

The present invention relates to a consumer electronics device, and more specifically, to configuration and management of menus for the consumer electronics device.

Background

Today's consumer electronics devices include multiple features and functionalities which typically require a graphical user interface with many layers of menus. As the number of features increases, the burden is on the user to learn how to navigate through the menus to access these features and functionalities. Because of the number of menu layers and the respective options provided at each layer, sometimes the user may have to navigate through a series of menu screens until an intended target screen is displayed. Browsing through the multiple screens implemented in a hierarchical menu structure can be very inconvenient. Accordingly, it would be helpful for the user if the user can design and define the structure of the menu layers.

SUMMARY

The present invention provides for customizing menus for a consumer electronics device.

In one implementation, a method of customizing menus for a consumer electronics device is disclosed. The method includes: preparing menu definitions for the menus to be customized on the consumer electronics device; generating menu configuration information using the prepared menu definitions; and transmitting the generated menu configuration information to the consumer electronics device.

In another implementation, a non-transitory storage medium storing a computer program to customize menus for a consumer electronics device is disclosed. The computer program includes executable instructions that cause a computer to: prepare menu definitions for the menus to be customized on the consumer electronics device; generate menu configuration information using the prepared menu definitions; and transmit the generated menu configuration information to the consumer electronics device.

Other features and advantages of the present invention will become more readily apparent to those of ordinary skill in the art after reviewing the following detailed description and accompanying drawings.

DETAILED DESCRIPTION

Figure 1:
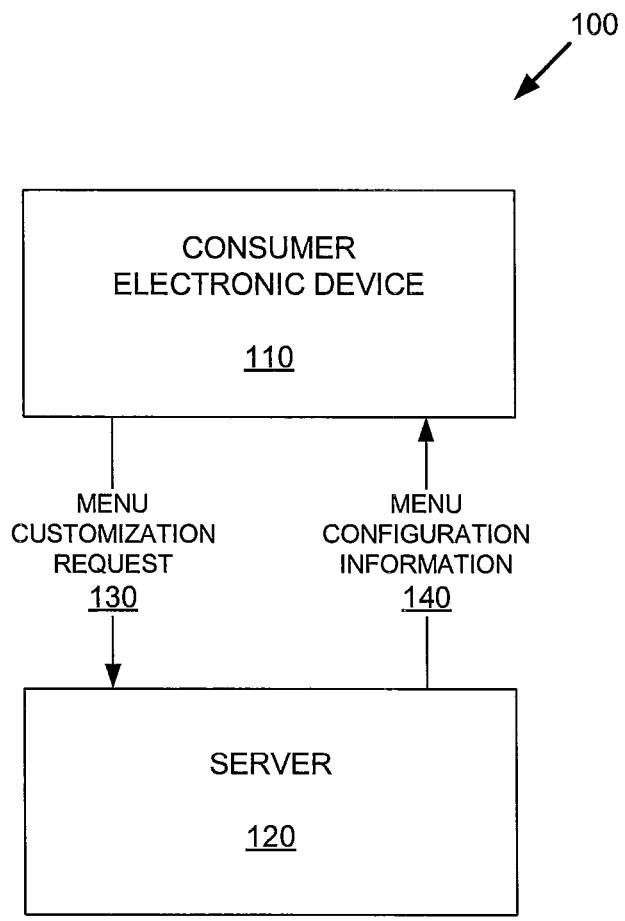
FIG. 1 is a functional block diagram of a menu customization system in accordance with one implementation of the present invention.

Certain implementations as disclosed herein describe apparatus, methods, and systems for configuration and management of menus. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, the menu configuration in a consumer electronics device is dynamically customized over a network. The customization is initiated by the device sending a menu customization request to a server. The request includes device specific information so as to enable the server to identify the consumer electronics device. In response to the received request, the server sends back menu configuration information to the consumer electronics device. The menu configuration information can be communicated using a configuration data with markup language format such as Extensible Markup Language (XML). However, other markup language formats such as HyperText Markup Language (HTML) can be used. The menu configuration information provides a set of menus that can include items which are standard predefined device menu items. Therefore, the menu definition for such items is not included in the configuration data sent to the consumer electronics device. By having the consumer electronics device request menus from the server, the menus on the device can be modified after the device has been shipped. This is especially true for consumer electronics devices that require them to be connected to the network to be fully functional such as devices that are used for Internet video.

The menu definition specified in the configuration data can be of the type that provides hierarchical arrangement of menu items. Ordering of the menus in the device and ordering of items in the menu can be specified in the configuration data including the menu specification which may include text and icon to use for each menu item. Further, the menu items defined in the configuration data are associated with an action. The menu action can be, for example, running a program code on the device, launching an Internet service, setting parameters on the device such as volume level, channel selection, picture settings, etc. The online address to which the device will connect to when an associated menu item is selected can be also defined in the configuration data. Thus this menu item may specify a network location from which the consumer electronics device downloads and executes code, and an URL to a web application to run when the menu item is selected. Nested sub-menus are permitted by allowing menus to be items in other menus.

The menu definition may also restrict the choices for a parameter that is set through the menus. This can include specifying the default choices, setting minimum and maximum values for a range, specifying the full set of choices to provide to the consumer, or specifying choices to add and/or remove from the default choices given to the consumer. The menu definition may include a menu action to specify a variety of actions to perform including: (1) launching an Internet service; (2) running code on the device; (3) and setting parameters on the device. The menu definition may also include a menu action to specify a network location that has the client download and run code when the menu item is selected. The menu definition may further include a menu item to contain application specific data that is given to the application launched by that menu item at the time it is launched. This gives the ability for a menu item to use one application for multiple functions by including instructions to that application about what to do when launched.

In additional implementations, the server receives a menu customization request from the consumer electronics device upon triggering of an event. The event may include any one of: (1) device power on; (2) a change in an IP address; (3) establishment of a network connection; and (4) a predefined period of time elapsing since the last request. The response to the menu customization request may include information that changes frequency or triggers that cause another menu customization request from the consumer electronics device. Further, the consumer electronics device is enabled to monitor a message directed to it that triggers the consumer electronics device to request a menu customization when it is received.

In another implementation, a menu configuration on a specific consumer electronics device is customized after the device has been shipped. For example, an off-the-shelf consumer electronics device (e.g., a television) is customized with special menus desired by a particular client such as a hotel. This substantially reduces the need to have a separate product line for a specially customized device. However, to accomplish such customization, each device needs to have a unique device identifier to communicate with the server when requesting menu and setting customizations. When a consumer desires to configure menu settings on the consumer electronics device, the device sends its device identifier to a server to obtain a temporary code. The server then returns the temporary code to the device, which the device displays on its screen so as to notify the consumer. The temporary code is used by the server to associate the consumer electronics device with a chosen configuration. When configuring menus, a code displayed on the consumer electronics device is used to ensure that a consumer configuring the consumer electronics device has physical possession of the device and that the device is properly connected to a network such that the device receives a menu customization.

In yet another implementation, each device receiving different menu customization does not require a unique device identifier. In this case, the country origin of the device making the request is identified and the menus given to the device are customized for that market. Thus, for example, a manufacturer can sell a single model in Canada, USA, and Mexico, and when connected to the network, the device can present Internet content choices in its menus that are authorized for the country origin of the device.

In additional implementations, the consumer accesses an administrative site to register the consumer electronics device. Thus, the device registration on the server defines the extent of entitlement for the device to a set of customizations. The administrative site can also be used for the purpose of removing customization from a device that has already been customized. The consumer can also customize the menu configuration on the device by calling a customer service agent. The user reads the temporary code returned by the server to the consumer electronics device to the agent, who then supplies the temporary code to the server through the administrative site. The server identifies the device to be customized based upon the temporary code it receives and associates the device with a menu configuration specific to the device. Further, the device can provide an option, such as a button or menu item, to the user to allow the user to trigger the device to request menu customizations from the server. The user would then do this when instructed to by the customer service agent or web site to immediately see the results of any changes on the device.

In another additional implementation, when a factory reset is performed on a client device, the device attempts to contact the server to notify it of the reset. If the server cannot be reached because the network access is unavailable, the client device stores the occurrence of a factory reset and communicates that occurrence to the server when the network access becomes available again. The client device notifies the server of the factory reset before any other network activity is performed. Upon receiving the factory reset notice from the client device, the server resets the configurations of the client device to the original state before the client device was taken out of the box and placed on a retailer's shelf. This allows a customer with customized devices to sell them as original factory devices. This may be necessary when the customer wants to sell off the unsold inventory of previously customized devices as original factory devices because the buyers are no longer interested in devices that are customized. This requires the device to store the original factory settings so that the device can be returned to its factory settings even when no network connection is available.

It should be noted that the factory reset removes any affiliations between the device and any account or user. It should also be noted that a factory reset will remove customizations done to a device to make the device act as a "floor model" that is put out by a retailer to show off the product. This allows a customer buying the floor model to receive a device in the same state as if the customer had purchased one from an unopened box. The factory reset would also reset things other than menu customizations. For example, if someone had turned up the brightness of the floor model, the factory reset would restore the brightness to its original level. After performing a factory reset on a device that is not connected to the network, the device will function the same as it would out of the box while still memorizing the fact that the factory reset was performed. Even if the device receives a lot of use before it is attached to a network again, it will still remember the fact that the first thing it must do over the new network connection is to communicate the fact that a network reset was performed.

In another implementation, an on-device application or website is used to access a server for making menu customization choices that are implemented on the consumer electronics device. In one example, a consumer can create a new "shortcuts" menu and duplicate all of the actions the consumer uses frequently into that menu. In another example, the consumer can save the current menu configuration in a "preset" menu so that the consumer can switch back to the same configuration quickly. It can be set up so that the parental control code is needed to switch the menus to that preset or from that preset. This allows the advanced parental control where the parent can set up "kids safe" menu choices that are normally left on the television. This can include such customizations as removing Internet channels that have objectionable content and setting the maximum value for the volume adjustment. A setting can be added to require parental control override to access a broadcast channel that is not a choice in the menus or channel up/down ordering by directly typing the station number.

Additional implementation relating to the parental control include: setting up a parental control code for a menu customization that is required to switch to another menu customization; and providing different parental control codes that allow access to different sets of menu customizations. Further, a password is required for an account used to register for a menu customization, wherein entry into an application of the menu customization can be made without going through a menu system.

Since the device is registered to an account on the server, a consumer who wishes to perform the device menu customization needs to present the password for the account that was originally used to register the device. This would ensure that only the true owner of the device can customize the menus of the device. The menu customization may include, adding items to menus, removing items from menus, reordering menu items, creating new menus or sub-menus, moving items from one menu to another, duplicating menu items, setting parental controls for controlling access to menu items, setting parameter choices for menu items which are used to adjust device parameters, for example, volume level, channel, brightness, contrast, hue, etc.

In additional implementations, managing the menus on a plurality of consumer electronics devices includes: managing the menus on the plurality of consumer electronics devices using a web site; configuring the plurality of consumer electronics devices through a call to a customer service agent; enabling a consumer to share customizations among consumer electronics devices; grouping the plurality of consumer electronics devices, and applying same configuration (named configuration) to the group; and enabling the consumer electronics device to ignore menu items that do not apply to it. Further, a consumer electronics device can be associated with the menu configuration information using a code displayed by the consumer electronics device.

In a further implementation, the device can write the menu customizations made by a user to a USB "thumb drive", memory card, or other detachable storage device. If the user then attaches that storage device to another device, the user would have the option to apply the same customizations to the menus currently on that device. Changes to menus not on the device or for functionality not available on the device would be ignored. Further, a first device could discover a second device on the local network and allow the user of the first device to apply menu customizations to its menus that it receives from the second device. The second device sends customizations performed by the user to the menus on that device. The customizations performed by the user may include applying menu customizations from a third device.

The consumer is allowed to share configurations between devices. This would be particularly useful for channel lineups and Internet channel selections. The device sends its customized menu definitions up to the server to allow them to be used with other devices. The customizations are in the form of changes made to the base configuration so that the customizations could be used with a different device that did not have exactly the same base menu items.

Additional implementations include: enabling a consumer to customize the menu, and controlling ordering, nesting, and availability of menu items; enabling a consumer to create named presets for menu customizations to allow switching between sets of customizations; having a menu preset that contains a setting for the language to use when that preset is applied; generating a menu customization that limits Internet channels and broadcast channels that can be accessed through the menus; setting maximum volume and parental rating limit when the menu customization is applied; adding menu items to the menu customization to switch to a particular preset of menu customizations; enabling a consumer to supply an image file which the consumer chooses to use for a menu item in the menu customization; specifying shared customizations in terms of changes so that the shared customization is applied to the consumer electronics devices with different base menus; applying multiple configurations to the consumer electronics device such that effects stack with each other and applying menu changes to the consumer electronics device through a web site. Further, the menu customization can include duplicate menu items, the menu customization can rename menu items, and the menu customization can specify icons to use for menu items.

In another implementation, a dynamic menu item identification and classification scheme is disclosed. This scheme addresses a need for the menus to be dynamically specified so that the server creating the menu definitions and the code running dynamically on the consumer electronics device can use the same menus. A need also exists for ordering of the menu items to be specified by the server, even for standard menus that are not used in the menu definition and even for unknown but dynamically-generated menus. Each menu needs a unique identifier such that different pieces of code can create identifiers and be ensured that the generated identifiers will not be a duplicate of an identifier generated by a different piece of code.

The scheme involves menu items of a dynamic menu system that are identified so that a set of menu definitions can specify and use the same menus that are modified dynamically at run time. The set of menu definitions can also control the ordering of menus and menu items, including existing menus defined by the device and dynamic menus and menu items that are added later at run time.

The scheme is accomplished through the use of predefined menu identifiers that are known by both the server making the menu definitions for the device and the code running on the device. The identifiers are used for two main purposes. The first purpose of the predefined menu identifiers is to identify specific menus and menu items. For example, the menu definitions may have an Internet video guide application in a menu entitled "Video". If the device senses that a media card was inserted which contains video files, then the device will add an item to the menu to allow the user to play those video files. The device will also add the media card to a "Video" menu. Since there is a predefined menu identifier for the video menu, the device determines that there is already a video menu and places the media card in the existing menu rather than confusing the consumer by creating another video menu. An empty definition of a menu with a predefined identifier can be placed in the menu definitions sent to the device to act as a place holder so that when the client code adds to that menu, it shows up in the proper location with the proper title and icon. When any menu is empty, it is not displayed to the user, but may still be in the menu structure to act as a place holder.

The second purpose of the predefined menu identifiers is to identify the locations within the menu structure where unknown dynamic items will be placed. For example, if the consumer runs an application that was written by a third party that provides menus to the consumer, the device code can search for a menu with a particular predefined identifier that would indicate where to place menu items dynamically generated by an application. In this case, the menus are only included as markers to particular places in the menu definitions and would not be displayed to the user.

In one example of the use of the predefined menu identifiers, when the user attaches a "thumb drive" containing video files to the USB port of the device, the device can add one or more menu items to a menu with the standard identifier of "VIDEO" to allow the user to navigate to those video files and play them. If the menu definitions contain a menu with identifier "VIDEO", then the menu items will be added to that menu rather than creating a new menu with identifier "VIDEO". If the menu was not shown because it is a place holder with no items in it, then the menu is made visible so that it will show up in the menu navigation when the first item is added to it. Similarly, if a menu is empty or only contains menus that are not visible after removing a dynamic item from it, then that menu will no longer be shown to the user in the menu navigation. It should be noted that when a device creates a dynamic menu with an identifier that is already in the device's menus, the existing menu with that identifier will be used, and when a device creates a dynamic menu with an identifier that is not already in the menus it will add the new dynamic menu to the menus.

In additional implementations, the naming schemes are used to prevent duplicate menu identifiers by different applications. By breaking up the menu identifier into namespaces by limiting the identifiers that can be generated by each part of the system, it ensures that the identifiers generated by each part of the system cannot duplicate an identifier that was legally generated by any other part of the system. Therefore, each part of the system just needs to ensure that the generated identifiers follow the naming scheme rules for that part of the system and do not duplicate other identifiers that it has generated. There are separate name spaces for the predefined menu identifiers (possibly broken down into standardized menus and place market menus), the menus defined by the server creating the menu definition XML, and each part of the client code that creates menu items.

The naming scheme can be accomplished in different ways as long as there is something about the identifiers generated by each partition of the name-space that is different from the identifiers generated by all of the other partitions of the name-space. One way to accomplish this is to use different prefixes for each portion of the name-space. For example, one partition may create identifiers that begin with a lowercase letter, another partition may create identifiers that begin with a capital letter, another partition may create identifiers that begin with a digit, and identifiers beginning with any of the other characters can be reserved for future use.

Each name-space partition can similarly be broken down by the code that is allowed to use that partition. For example, if the device code was generating the names that start with a lower case letter, the device code could partition that name-space into smaller name-spaces for use by the various pieces of code running on the device. The device will use all of the menu definitions, but it will only generate definitions with identifiers within a single partition. In a particular example, it might reserve the identifiers starting with letter "a" for third party applications. The identifiers starting with letter "a" might have the next five characters used for the process identifier of the application, then everything after that is generated by the application. Accordingly, the application can generate menu identifiers and the device code adds that application's six character unique prefix in front of those identifiers before using the identifiers in the system menus.

Predefined menu identifiers can be defined in a master list known on the server for all of the menus and menu locations that are known at the time the system is created. As new menus and menu locations arise later, those identifiers can be added to the list of predefined identifiers. It should be noted that by limiting the predefined menu identifiers to a single partition of the name space, new identifiers can be generated without the possibility of conflict with identifiers generated in other partitions of the namespace, such as those created by the device or those created by the server.

In further implementations, the specific menu is configured as a standard device menu populated with standard menu items. The naming schemes are used to prevent a first menu identifier generated dynamically by the consumer electronics device from interfering with a second menu identifier generated by an application creating the menu definitions. Further, a menu definition indicates that a menu is a standard pre-defined menu of the consumer electronics device. The menu definitions can be added to the menus without having to define the menus. For example, indicating a menu with the pre-defined identifier of "SOUND" could include the device's standard sound menu at that position in the menu structure without needing to specify what is in the sound menu. Further, when specifying a pre-defined menu in the menu structure, the menu definition can indicate that items from that menu are to be left out and can specify menu items to add to the items in that menu.

In another implementation, user management of menu customization on the consumer electronics device is disclosed. This implementation is particularly useful for consumers that own multiple devices, such as a hotel or sports bar. Further, this implementation addresses a need to easily control various menu configurations across a number of consumer electronics devices, groups of which will be used for various different things. There is also a need to allow for automated control over consumer electronics device menus. The customization includes one or more of the following: consumer adds menu items to an electronic device, wherein the menu items allow access to a specific multimedia content (e.g., adding menu items to a television in a hotel room in order to allow a user to access a specific program or channel); consumer secures the access to a specific multimedia content upon check-in by associating a parental control code with the electronic devices, wherein the code may correspond to the last four digits of the user's credit card number; consumer sets the specific settings of the consumer electronics device, which may include operating the device at a particular channel, particular volume level, etc., when it is switched on; consumer applies default/standard settings (e.g., setting brightness, hue, and picture mode, opening the curtains and setting the air conditioning to a particular temperature) on occurrence of a particular event, for example, when a user checks out from a hotel room. In enabling a customer to add menu items to applications that can control things, such as open or close the curtains or adjust the thermostat through the television, the applications can be implemented in multiple ways, such as web applications or portable code such as Java or Flash to prevent the need for a custom compiling code into one or more versions particular to the devices it will be executed on.

In this implementation, the consumer is allowed to access an administration console to customize the menus on the consumer electronics device. This control can also be provided through an application programming interface (API) to allow automated control by the consumer. For example, by using the API, a hotel can automatically add menu items to a television in a room to access "adult" content if the guest requests that during check-in. The agent who checks the guest in can simply check a check-box on the agent's computer screen.

In another implementation, the consumer also has the option to group the devices into named groups that can have the same configuration applied to the whole group of devices through a single setting. In yet another implementation, the consumer is also able to create numerous named configurations that can be applied to individual devices. These configurations can be stacked on top of each other so that numerous configurations can be applied to the same device. For example, a device can have a base configuration that sets up a standard set of menus, a configuration that removes a particular menu item, and another configuration that adds two menus. Thus, the customizations discussed above include: (1) group customizations that would apply to all devices in a group (e.g., the hotel adds a menu item to launch the check-out application or room service menu application, or the hotel removes a menu for a network setup); and (2) customizations that would apply to individual devices (e.g., the hotel sets the parental control PIN based on the customer's credit card number, or adds an adult menu upon request of the customer). These two different ways of managing multiple devices owned by a single customer (managing by group, and managing individual devices) can be used in combination. An API can be used for either type of management.

In this implementation, the specified customizations are not limited to just specifying the system menu choices. For example, the specified customizations can include customization for the power-on state that can set the tuner to a particular channel, set the volume to a particular level, or just set a maximum level for the volume so that the power cycling will not result in the volume increasing. Further, the programming interface can allow direct setting of the television's parameters. For example, the television in a room can be set to standard settings on checkout for items such as brightness, hue, and picture mode. This is similar to how the customizations can specify settings for parameters to be applied on a particular event such as power-on or power-off. The programming interface also allow for the setting of the parental control password. A hotel can use this to automatically set the password of the parental control to the last four digits of the credit card used to check-in as this number would be easily accessible to the adult that checked in but any children would probably not know it.

In additional implementations, the specified customization is extended to control all types of home automation in addition to the consumer electronics device. This implementation can allow the programming interface calls made on checkout and check-in to perform such actions as opening the curtains and setting the air conditioning to a particular temperature. Thus, this implementation could provide a cost savings for a hotel since it can turn off the air conditioning in a room once the guest checks out and turn it back on to cool the room back down in time for a next check in. The curtains can be closed on check-out to decrease the amount of heat entering through the window and opened on check-in so that the light is let into the room when the guest arrives. It should be noted that the control over things in the room such as curtains and air conditioning can also be done by the guest using the television through menu items or applications run on the device.

Examples of specified customizations include a hotel setting up a group of devices (e.g., televisions) in each of the class of rooms. The hotel defines a standard set of menus to use as a base for all of the hotel's televisions, which would include, for example, the hotel specific menus for the restaurants and guides to the local attractions. The guide could list specials at the local restaurants with unique codes that could be used to take advantage of the specials and provide enough tracking that the restaurant could pay revenue sharing to the hotel. The hotel could also create a set of customizations that is applied on top of the standard configuration to add special choices to the televisions in the premium rooms. The hotel could further create a group for the televisions in the sports bar that could be configured completely differently than the televisions in the rooms.

In another implementation, menu customization and localization by language and country is disclosed. This implementation is configured to deliver a customized system menu on a device by languages supported by the device, the country or location of the devices, and the services allowed. The implementation deploys a server which detects the location of the device and the languages supported by the device, and based on this information, the server intelligently delivers the tailored system menu including the services or applications which are available for particular locations and accessible in particular languages. This implementation addresses a need to deliver a system menu to a requesting device that is located in a specific country or configured in a specific language. The implementation also addresses a need to respect the current business rule where if a service is not allowed in a certain country, the service will not appear in the service list and will not be accessible to the consumer.

In this implementation, the server determines the location of the device (e.g., the country where the device is located) requesting the system menu definitions based on its Internet Protocol (IP) address and provides menus customized for that location. For example, some services may not be available in a particular country where the device is located. The server also determines the language(s) supported by the consumer electronics device and customizes the system menu definitions based on that determination. For example, if a device does not support the Chinese language, then the server can leave out services that require the Chinese language. An administrator or electronic manufacturer can set up a system menu in multiple languages for some countries. In another example, a parental rating system may differ from country to country. That is, by law different parental rating systems are used in different countries. By tailoring the menus to the country where the device is located, the menus are tailored to the appropriate parental rating system and the device applies the appropriate parental rating system. In yet another example, if the menu definitions provided to the device include translations for multiple languages, then the user can change the language preference on the device and see the menus in their newly chosen language even when the device is not connected to the network to get new menu definitions for the new menu selection.

It should be noted that the languages supported by a device are limited by the font sets included on the device. For example, a device that does not have a font with the Chinese characters cannot support the Chinese language. If the device has enough storage space, it can dynamically download the needed characters when the device is in a country where the corresponding language should be made available or when the user requests a language for which the device does not have the character set loaded. If the device is not connected to the network when the user requests the language that needs a dynamic font download, the device can inform the user that the language choice will not be available until the device is connected to the network to download the requested language support.

In additional implementations, following are disclosed: (a) preparing menu definitions for the menus to be customized on the consumer electronics device includes providing menus customized in accordance with a current business rule, wherein only services that are allowed for the consumer electronics device are made accessible through the menus; (b) customizing the services included in the menus based on capabilities of the consumer electronics device; (c) providing the menus with translations for the one or more languages so that when a user changes a menu language preference the same menus can be presented to the user in a newly-selected language; (d) customizing the menu definitions transmitted to the consumer electronics device based on (1) the menu language preference set on the consumer electronics device or (2) the languages supported by the device, especially in the case where the response contains translations for multiple languages; (e) determining the country where the consumer electronics device is located based on the IP address it uses; or (f) providing a single menu customization that includes the one or more languages, wherein only the one or more languages applicable for consumer electronics device are included in the menu customization when it is sent to the device.

Regarding item (b) above, the menus can be tailored based on the capabilities of the consumer electronics device based on a menu item definition indicating what functionality is required for that menu item to be displayed by the device. That is, the same menu item definition can be given to a plurality of devices with differing capabilities and the menu item will only be displayed on the devices that support the indicated functionality. This makes the management of menu definitions simpler as separate versions with and without the menu item do not need to be created and there is no need for logic to determine whether the definitions with or without the menu item should be sent to each device. Other examples may include enabling the consumer electronics device to ignore menu items that do not apply to it, and enabling the consumer electronics device to verify that a menu item is marked as needing a capability is not shown by the device if it does not have the capability. In a further example, a menu item to launch a service full of 3-D content can be marked as requiring 3-D support on the device so that it does not show up in a non-3D device even if it is included in the menu definitions sent to that device and even if that device knows how to launch a service full of content. For a specific example, the menu item to play a movie trailer that is in a 3-D format explicitly indicates that the 3-D capability is needed for the menu item so that a device that does not support 3-D would not show that menu item. Further, the same menu definitions displayed on the same device may display a menu item sometimes but not other instances if it indicates it requires functionality that is available only occasionally. For example, a menu item can be shown only when 3-D capability is enabled on a TV and not shown when 3-D capability is disabled on the same TV.

In another implementation, collection and analysis of dynamic system menu usage statistics/data on the consumer electronics device is disclosed. This implementation includes monitoring, tracking and accumulating menu or system menu usage data (e.g., how the user navigates through the menu). The implementation also includes transmitting the statistics to a server for analysis in order to give insight into the consumer usage of the menus and to improve the design of the menu interface. The menu usage statistics include: frequency of the menu usage; day and time of the usage; a series of menu item clicks or selections to determine a sequence of activity or path taken by a consumer; a type of application launched; duration between two menu selections; and a frequency of language changes. The menu usage statistics may also include button presses on a remote control.

Additional implementations include: an administrator specifying what and which type of information to collect for customization; buffering collected data at the consumer electronics device and transmitting during off-peak hours to alleviate network load; using circular buffers to store the collected data at the consumer electronics device; and aggregating the data across many devices to determine regional variation of use and preferences. Other implementations include: directing the consumer electronics device to send the menu usage statistics at a pre-defined interval; specifying to the consumer electronics device a type of the menu usage statistics to collect and send; enabling the consumer electronics device to send the menu usage statistics along with the menu customization request; and enabling the consumer electronics device to send the menu usage statistics when it is triggered to send the menu usage statistics. It should be noted that the sending of statistics can be made separate from a request for menu customizations, and that the sending can be triggered through separate criteria that can include any of the settings or events that can be used for triggering a request for menu statistics.

FIG. 1 is a functional block diagram of a menu customization system 100 in accordance with one implementation of the present invention. In the illustrated implementation of FIG. 1, the menu configuration in a consumer electronics device 110 is dynamically customized over a network. The customization is initiated by the device 110 sending a menu customization request 130 to a server 120. The request 130 includes device specific information so as to enable the server 120 to identify the consumer electronics device 110. It should be noted that the menu customization request 130 is optional as some implementations will have the server send the menu customization information to the device without the device making the request, such as a customization triggered by a guest checking into a hotel.

In response to the received request 130, the server 120 sends back menu configuration information 140 to the consumer electronics device 110. The menu configuration information 140 can be communicated using a configuration data with markup language format such as Extensible Markup Language (XML). Other formats such as JavaScript Object Notation (JSON) can be used. The menu configuration information 140 provides a set of menus that can include items which are standard predefined device menu items. Although the set of menus can imply that the menu customizations must define the full set of menus, the menu customizations may just include adjustments to make to the existing menus. Therefore, the menu definition for such items may not be included in the configuration data sent to the device. That is, the details of the menu item can be left out when specifying a standard predefined device menu item. By having the consumer electronics device 110 request menus from the server 120, the menus on the device 110 can be modified after the device has been shipped. This is especially true for consumer electronics devices that require them to be connected to the network to be fully functional such as devices that are used for Internet video.

Figure 2A:
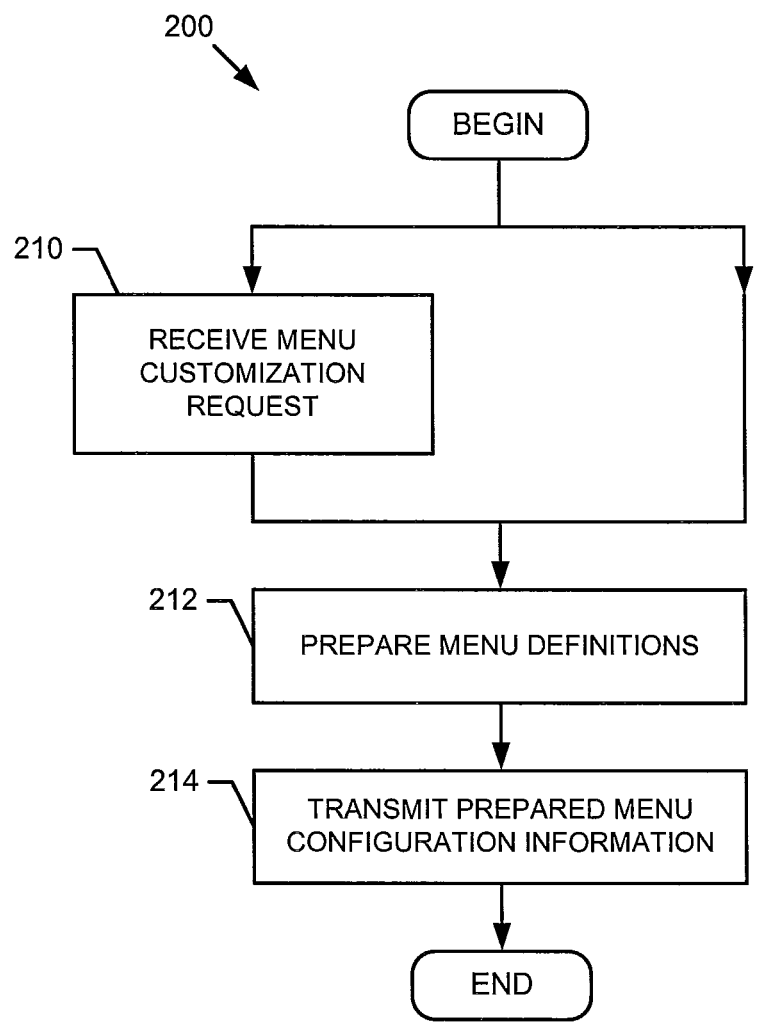
FIG. 2A is a flowchart illustrating a method of dynamically customizing a consumer electronics device over a network in accordance with one implementation of the present invention.
Figure 2B:
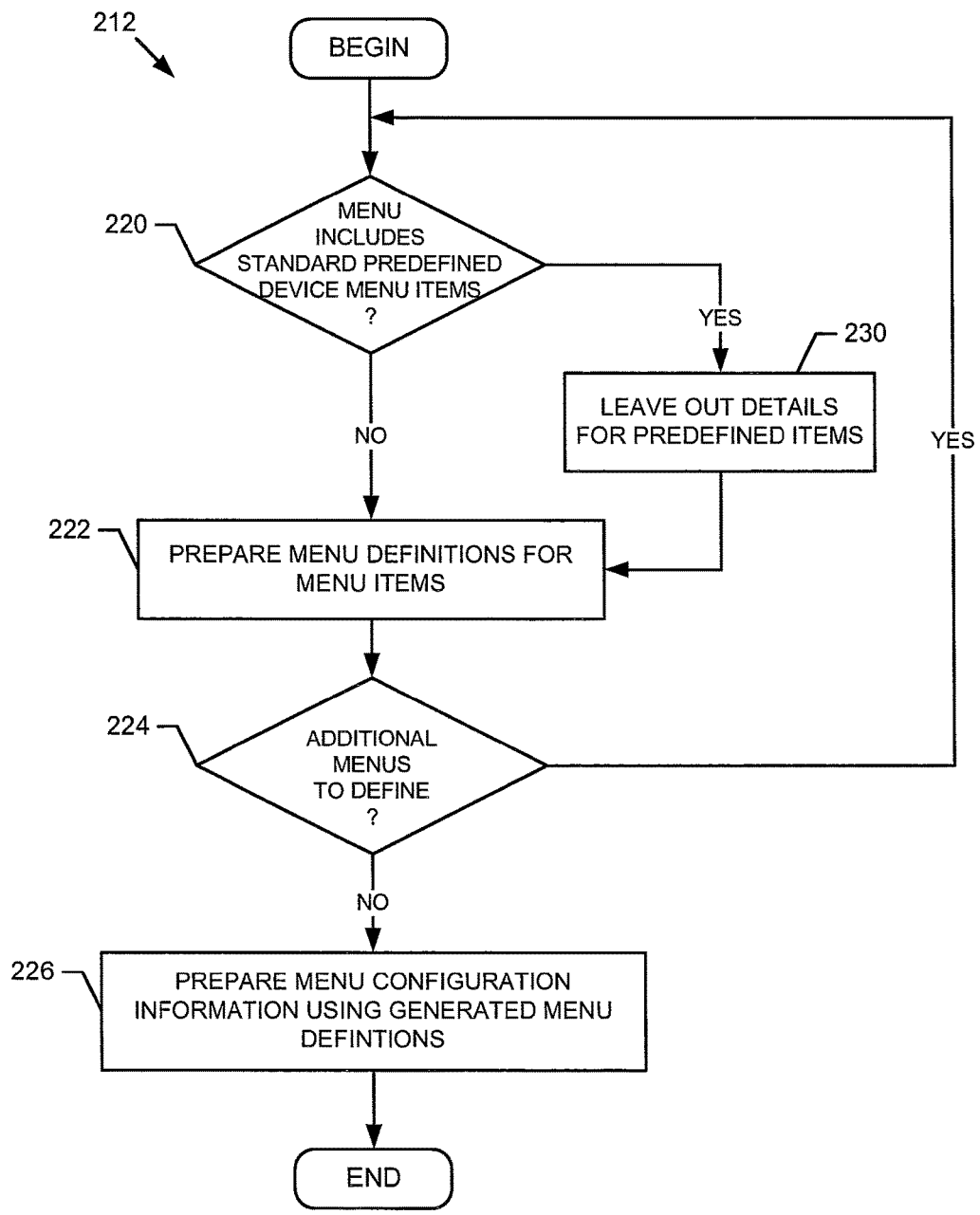
FIG. 2B is a flowchart illustrating a detailed process for preparing menu definitions.

FIG. 2A is a flowchart 200 illustrating a method of dynamically customizing a consumer electronics device over a network in accordance with one implementation of the present invention. In the illustrated implementation of FIG. 2A, the customization is initiated by the consumer electronics device sending a menu customization request to a server. The request includes device specific information so as to enable the server to identify the consumer electronics device. Thus, the server receives the menu customization request from the consumer electronics device, at box 210. In the alternative, the server can directly send the menu customization information to the device when the menu change was not triggered by a request from the device. For example, the system changes the menus on a device in response to a customer checking into a hotel. Accordingly, the server prepares menu definitions for menu configuration information, at box 212. A detailed process for the preparation of menu definitions is illustrated in FIG. 2B.

In preparing menu definitions for menu configuration information (at box 212), the server determines, at box 220, whether a set of menus for the menu configuration information includes items which are standard predefined device menu items. If it is determined, at box 220, that the set of menus includes items which are standard predefined device menu items, the details for predefined items are left out, at box 230. The menu definitions for the menu configuration information are then prepared, at box 222. If a determination is made, at box 224, that there are additional menus to define, then additional menu definitions are prepared for the additional menus. The prepared menu definitions are then used to generate menu configuration information, at box 226. The prepared menu configuration information is then transmitted, at box 214 (FIG. 2A), to the consumer electronics device.

The menu definition specified in the configuration data can be of the type that provides hierarchical arrangement of menu items. Ordering of the menus in the device and ordering of items in the menu can be specified in the configuration data including the menu specification which may include text and icon to use for each menu item. Further, the menu items defined in the configuration data are associated with at least one action. The menu action can be, for example, running a program code on the device, launching an Internet service, setting parameters on the device such as volume level, channel selection, picture settings, etc. The online address to which the device will connect to when an associated menu item is selected is also defined in the configuration data. Nested sub-menus are permitted by allowing menus to be items in other menus.

The menu definition may also restrict the choices for a parameter that is set through the menus. This can include specifying the default choices, setting minimum and maximum values for a range, specifying the full set of choices to provide to the consumer, or specifying choices to add and/or remove from the default choices given to the consumer. The menu definition may include menu action(s) to specify a variety of actions to perform from launching an Internet service to running code on the device to setting parameters on the device. The menu definition may also include menu action(s) to specify a network location that has the client download and run code when the menu item is selected. The menu definition may further include a menu item to contain application specific data that is given to the application launched by that menu item at the time it is launched. This gives the ability for a menu item to use one application for multiple functions by including instructions to that application about what to do when launched.

In another implementation, a dynamic system menu that launches an Internet or native application can be specified. In this case, the menu item includes a string of configuration data that is used by the application. The leaf of each menu item has an action type associated with the menu item. In another case, a leaf may also be a menu which would not have an action. Such an empty menu may be used in the case of a predefined menu that is used as a place holder so that the device knows where to place dynamically generated menu items. Further, the menu item specifies a particular system setting or parameter that it modifies. The possible choices of settings/parameter can be taken from the default list of options for the device or may be stated explicitly. In this implementation, a user is allowed access to an administration console to specify a menu to launch an Internet content service such as the Bravia Internet Video Link (BIVL) service, a native application, or other similar services or applications. The Internet content service application can be a service, general application, website, widget, and/or other program that requires communicating back to a server. A native application can be a service, general application (e.g., calculator, maps, etc), URL/URI, widget, and/or other program that is native or local to a device that does not require communication back to the server. In this implementation, the user has the option to enter the launch target and input configuration data specific to launching the target. The target defines two types: Internet content service and native application. The benefits of specifying the launch of a native application are as follows: a device can launch a native application and a local application that are specific to a device or product group and allow for granular control of system menus; and a device can have all the necessary configuration data specific to launching a non-streaming native application in the event that the network connection is no longer present.

Figure 2C:
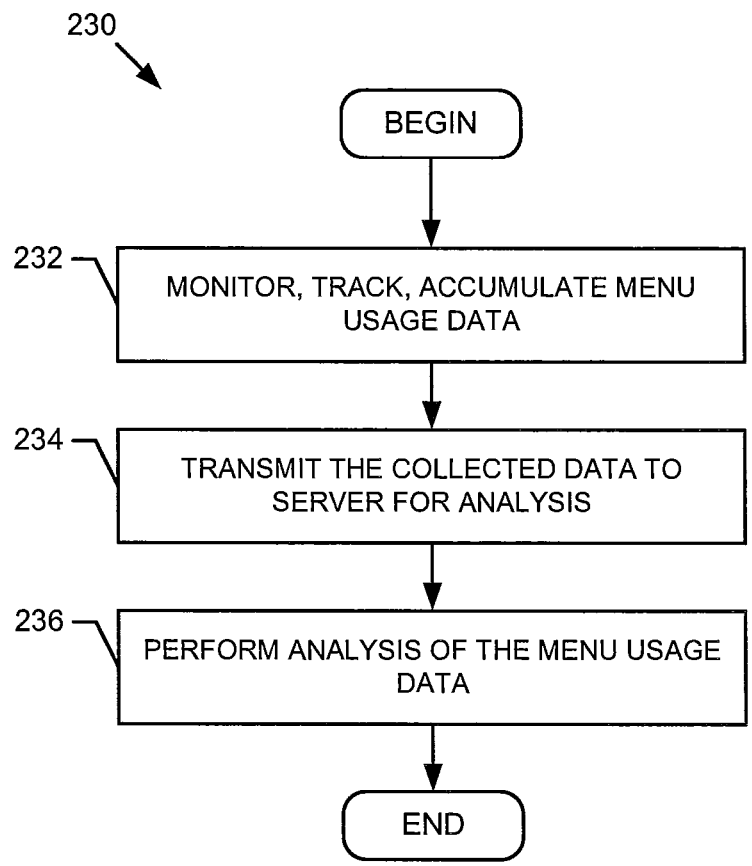
FIG. 2C is a flowchart illustrating a method of collecting and analyzing dynamic system menu usage statistics on a consumer electronics device in accordance with one implementation of the present invention.

FIG. 2C is a flowchart 230 illustrating a method of collecting and analyzing dynamic system menu usage statistics/data on a consumer electronics device in accordance with one implementation of the present invention. In the illustrated implementation of FIG. 2C, menu usage data (such as how the user navigates through the menu) is monitored, tracked and accumulated, at box 232. The method also includes transmitting the collected menu usage data, at box 234, to a server for analysis, at box 236, to provide insight into the consumer usage of the menus and to improve the design of the menu interface. In one implementation, the consumer electronics device is triggered to send the menu usage data once a certain quantity of data has been collected by the consumer electronics device. The menu usage data include: frequency of the menu usage; day and time of the usage; a series of menu item clicks or selections to determine a sequence of activity or path taken by a consumer; a type of application launched; duration between two menu selections; and a frequency of language changes. The menu usage statistics may also include button presses on a remote control. In addition to the frequency of language changes, the languages that were chosen are of interest as is the language in use when other menu items are chosen. For example, if the statistics show that users have a hard time locating a particular menu item when the language is set to French, but not when the language is set to English or Spanish, then that could indicate that the French translation for that menu item may need to be reworded.

In another implementation, the menu usage data is analyzed to improve a design of the menus on the consumer electronics device. For example, the menu usage data is analyzed to break down the analysis by the displayed language to identify a particular translation that may need improvement if a menu item is less used or harder to find when the menus are displayed in a particular language. Other examples include moving popular menu items to places that allow quicker access including (1) locations that need to scroll through fewer menu items, (2) locations that need to navigate through fewer menu levels, or (3) locations in the menus that are easiest to access.

Figure 3A:
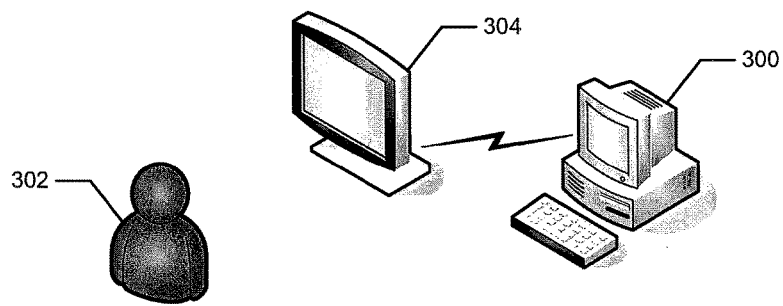
FIG. 3A illustrates a representation of a computer system and a user.

FIG. 3A illustrates a representation of a computer system 300 and a user 302. In one implementation, the computer system can be configured as a server (e.g., reference 120 in FIG. 1) configured to provide menu customization for a consumer electronics device 304.

Figure 3B:
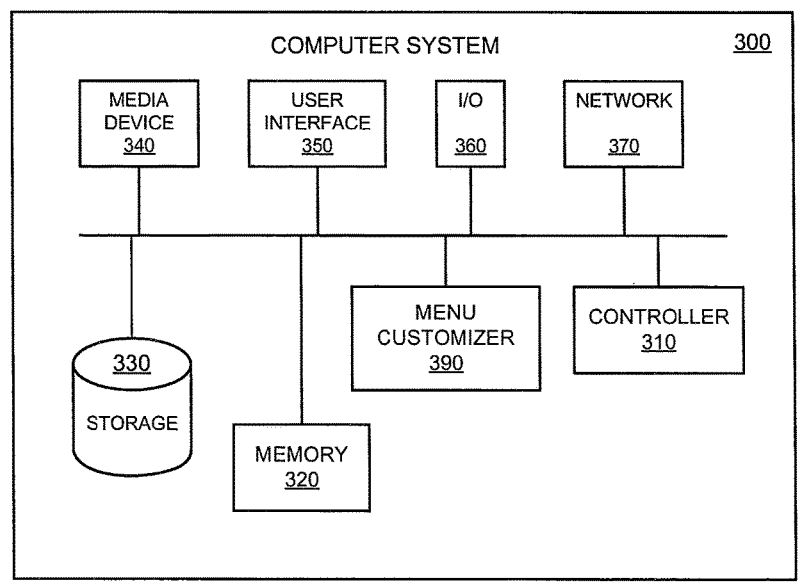
FIG. 3B is a functional block diagram illustrating the computer system hosting a menu customizer.

FIG. 3B is a functional block diagram illustrating the computer system 300 hosting a menu customizer 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 loads executable codes from the menu customizer 390 as a software system (running on the server 120 of FIG. 1). Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Non-transitory storage 330 stores data for use by other components of the computer system 300, such as for storing data used by the menu customizer 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user 302 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the specification focuses on menus for a consumer electronics device, menus for any home automation such as a home alarm system can be selected for customization. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of customizing menus for a consumer electronics device, the method comprising:
   receiving a menu customization request from the consumer electronics device upon triggering of an event including changing of an IP address of the consumer electronic device;
   preparing menu definitions for the menus to be customized on the consumer electronics device,
   wherein the menu definitions restrict choices for parameters that are set through the menus, wherein the menu definitions include at least one menu action to specify a variety of actions to perform;
   performing the variety of actions including: (a) running a program code on the consumer electronics device; (b) launching an Internet service; (c) navigating to a uniform resource locator (URL) including running a web application; and (d) setting parameters on the consumer electronics device including volume level, channel selection, and picture settings, wherein each menu of the menus includes a plurality of menu items,
   wherein the menus are tailored based on the capabilities of the consumer electronics device based on a menu item definition indicating a functionality required by the consumer electronics device for each menu item,
   wherein the same menu item definition is given to a plurality of consumer electronics devices with differing capabilities and each menu item is only displayed on the plurality of consumer electronics devices that supports the indicated functionality;
   generating menu configuration information using the menu definitions; and
   transmitting the menu configuration information to the consumer electronics device.

2. The method of claim 1, wherein the menu configuration information comprises a markup language format.

3. The method of claim 1, wherein the menu configuration information does not need to include the menu definitions for predefined device menu items.

4. The method of claim 1, wherein the menu configuration information comprises the menu definitions for device menu items.

5. The method of claim 4, wherein the menu definitions specified in the menu configuration information are of a type that provides hierarchical arrangement of the device menu items.

6. The method of claim 4, wherein the menu configuration information specifies text and icons to use for each menu item of the device menu items.

7. The method of claim 1, wherein the menu configuration information specifies ordering of the menus in the consumer electronics device.

8. The method of claim 1, wherein the menu configuration information defines nested sub-menus by allowing the menus to be menu items in other menus.

9. The method of claim 1, wherein the menu customization request includes device specific information to identify the consumer electronics device.

10. The method of claim 1, wherein preparing menu definitions for the menus to be customized on the consumer electronics device comprises
providing the menus customized for the consumer electronics device that is making the menu customization request.

11. The method of claim 10, wherein providing the menus customized for the consumer electronics device comprise
tailoring the menus such that menu items for parameters not on the consumer electronics device are left out.

12. The method of claim 10, wherein providing the menus customized for the consumer electronics device comprise
tailoring the menus such that menu items for services that provide content using a codec that is not supported by the consumer electronics device are left out.

13. The method of claim 1, wherein a response by a server to the menu customization request comprises information that changes frequency of menu usage or triggers that cause another menu customization request from the consumer electronics device.

14. The method of claim 1, wherein the menu customization request comprises functionalities supported by the consumer electronics device.

15. The method of claim 1, wherein said preparing menu definitions for the menus to be customized on the consumer electronic device comprises:
detecting a country in which the consumer electronic device is located; and
providing the menus customized for the country.

16. The method of claim 15, wherein said preparing menu definitions for the menus to be customized on the consumer electronics device comprises
providing the menus customized in accordance with a current business rule,
wherein only services that are allowed in the country are made accessible through the menus.

17. The method of claim 15, further comprising
determining the country where the consumer electronics device is located based on the IP address it uses.

18. The method of claim 1, wherein said preparing menu definitions for the menus to be customized on the consumer electronics device comprises
providing the menus customized in accordance with a current business rule,
wherein only services that are allowed for the consumer electronics device are made accessible through the menus.

19. The method of claim 1, further comprising
customizing services included in the menus based on capabilities of the consumer electronics device.

20. The method of claim 1, further comprising
detecting one or more languages selected by a user of the consumer electronics device.

21. The method of claim 20, wherein detecting one or more languages comprises
detecting one or more languages supported by the consumer electronics device.

22. The method of claim 1, wherein said preparing menu definitions for the menus to be customized on the consumer electronics device comprises:
detecting one or more languages selected by a user of the consumer electronics device; and
providing the menus customized for the one or more languages.

23. The method of claim 22, further comprising
providing the menus with translations for the one or more languages so that when a user changes a menu language preference the same menus can be presented to the user in a newly-selected language.

24. The method of claim 23, further comprising
customizing the menu definitions transmitted to the consumer electronics device based on the menu language preference set on the consumer electronics device.

25. The method of claim 22, further comprising
providing a single menu customization that includes the one or more languages,
wherein only the one or more languages applicable for consumer electronics device are included in the menu customization when it is sent to the device.

26. The method of claim 25, further comprising
enabling a user of the consumer electronics device to change the one or more languages without a network access for the consumer electronics device.

27. The method of claim 1, further comprising
performing a factory reset on the consumer electronics device to restore the menus of the consumer electronics device to an original out-of-the-box state.

28. The method of claim 27, wherein performing a factory reset comprises
resetting any associations of the consumer electronics device.

29. The method of claim 28, wherein resetting any associations comprises:
resetting even when the consumer electronics device is not connected to a network; and
transmitting that a factory reset was performed as soon as the consumer electronics device has network connectivity restored.

30. A non-transitory storage medium storing a computer program to customize menus for a consumer electronics device, the computer program comprising executable instructions that cause a computer to:
receive a menu customization request from the consumer electronics device upon triggering of an event including changing of an IP address of the consumer electronic device;
prepare menu definitions for the menus to be customized on the consumer electronics device,
wherein the menu definitions restrict choices for parameters that are set through the menus, wherein the menu definitions include at least one menu action to specify a variety of actions to perform;
performing the variety of actions including: (a) running a program code on the consumer electronics device; (b) launching an Internet service; (c) navigating to a uniform resource locator (URL) including running a web application; and (d) setting parameters on the consumer electronics device including volume level, channel selection, and picture settings,
wherein each menu of the menus includes a plurality of menu items,
wherein the menus are tailored based on the capabilities of the consumer electronics device based on a menu item definition indicating a functionality required by the consumer electronics device for each menu item,
wherein the same menu item definition is given to a plurality of consumer electronics devices with differing capabilities and each menu item is only displayed on the plurality of consumer electronics devices that supports the indicated functionality;

generate menu configuration information using the prepared menu definitions; and transmit the generated menu configuration information to the consumer electronics device.

\* \* \* \* \*